US010986830B2

(12) United States Patent
Lawrence

(10) Patent No.: US 10,986,830 B2
(45) Date of Patent: Apr. 27, 2021

(54) APPARATUS AND METHOD FOR REPELLING INSECTS

(71) Applicant: Mindy A. Lawrence, Lakeville, MN (US)

(72) Inventor: Mindy A. Lawrence, Lakeville, MN (US)

(*) Notice: Subject to any disclaimer, the term of this patent is extended or adjusted under 35 U.S.C. 154(b) by 128 days.

(21) Appl. No.: 16/113,311

(22) Filed: Aug. 27, 2018

(65) Prior Publication Data

US 2019/0075777 A1 Mar. 14, 2019

Related U.S. Application Data

(60) Provisional application No. 62/557,582, filed on Sep. 12, 2017.

(51) Int. Cl.
*A01M 7/00* (2006.01)
*A01M 29/34* (2011.01)

(52) U.S. Cl.
CPC .......... *A01M 7/0003* (2013.01); *A01M 29/34* (2013.01); *A01M 2200/01* (2013.01)

(58) Field of Classification Search
CPC .... A01M 7/0003; A01M 29/30; A01M 29/32; A01M 29/34; A01M 2200/01; A01M 29/00; A01M 7/00; A01M 7/0014; E03B 9/20; B05B 12/122; B05B 12/12; B05B 12/02; B05B 12/004; B05B 15/65
USPC ...... 220/87.1, 87.2; 239/67, 274; 222/52–69
See application file for complete search history.

(56) References Cited

U.S. PATENT DOCUMENTS

| | | | |
|---|---|---|---|
| 3,918,616 A * | 11/1975 | Goldsmith | B65B 39/005 222/504 |
| 6,054,658 A | 4/2000 | Duhon et al. | |
| 7,176,397 B2 * | 2/2007 | Grzan | H01H 3/141 200/302.1 |
| 7,320,418 B2 * | 1/2008 | Sassoon | A61L 2/18 222/1 |
| 8,430,337 B2 | 4/2013 | Pearce, III et al. | |
| 9,108,782 B2 | 8/2015 | Luc et al. | |
| 9,592,178 B1 * | 3/2017 | Cargill | A61H 33/6005 |
| 2002/0030593 A1 * | 3/2002 | Leen | G08B 13/19 340/540 |
| 2006/0180678 A1 * | 8/2006 | Balogh | E01H 10/005 239/1 |
| 2009/0265977 A1 * | 10/2009 | Sullivan | A01M 7/0021 43/132.1 |

(Continued)

*Primary Examiner* — Tuongminh N Pham
*Assistant Examiner* — Juan C Barrera
(74) *Attorney, Agent, or Firm* — Jonathan M. Rixen; Lemaire Patent Law Firm, P.L.L.C.

(57) ABSTRACT

A system for repelling insects from an object (e.g., a beverage dispenser), the system including a mister device configured to generate a mist at the object; and a sensor operatively coupled to the mister device and configured to produce a sense signal when a user of the object is detected by the sensor, wherein the mister device is configured to stop generation of the mist based at least in part on the sense signal such that the user can use the object without being exposed to the mist, and wherein the mister device is further configured to restart generation of the mist once the user is no longer detected by the sensor. A method that includes generating a mist at an object; detecting a user of the object; and stopping the generating of the mist based at least in part on the detecting of the user.

8 Claims, 10 Drawing Sheets

(56) References Cited

U.S. PATENT DOCUMENTS

2014/0144389 A1* 5/2014 Richards ............ A01M 31/002
                                                                          119/712

* cited by examiner

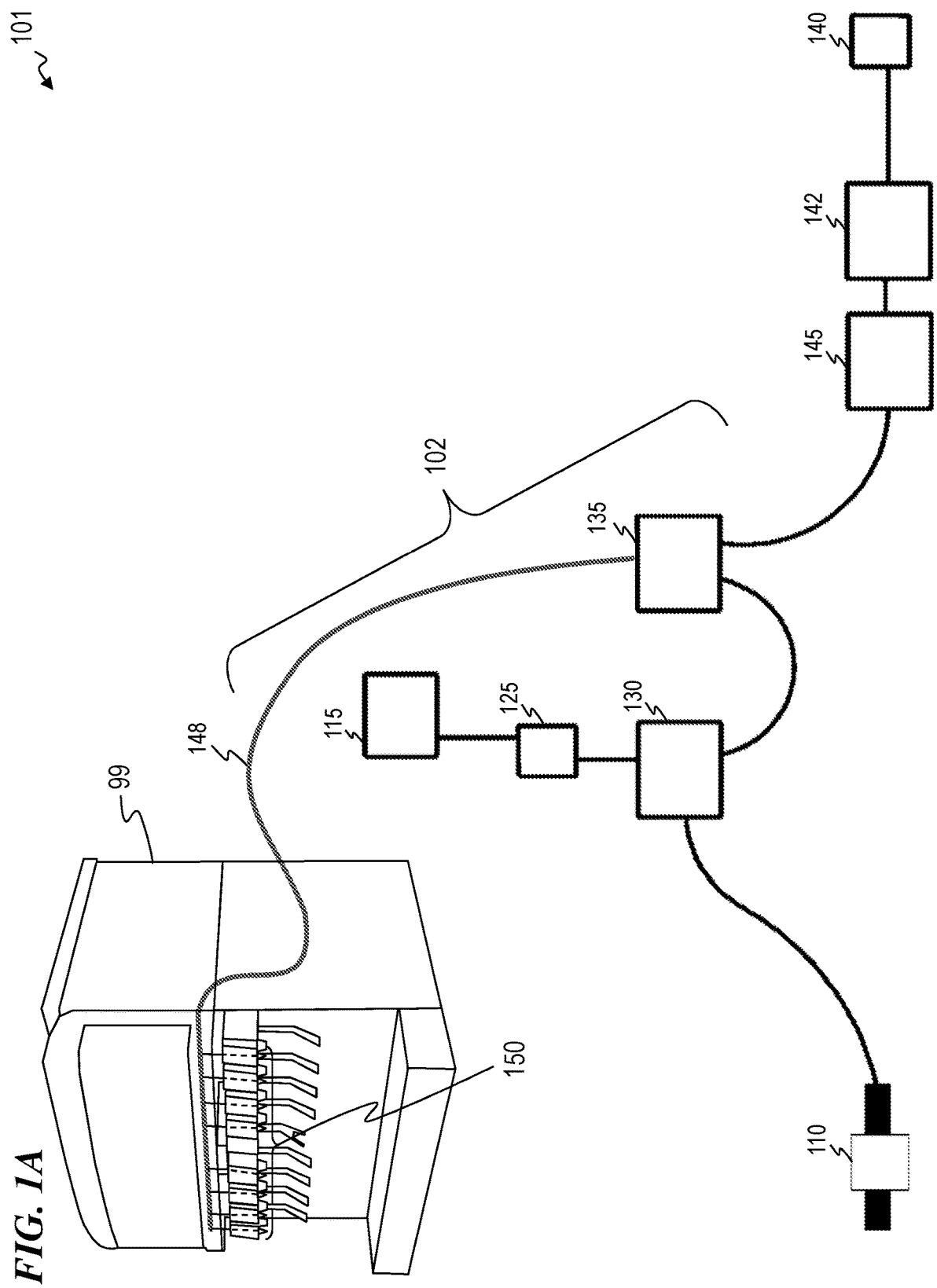

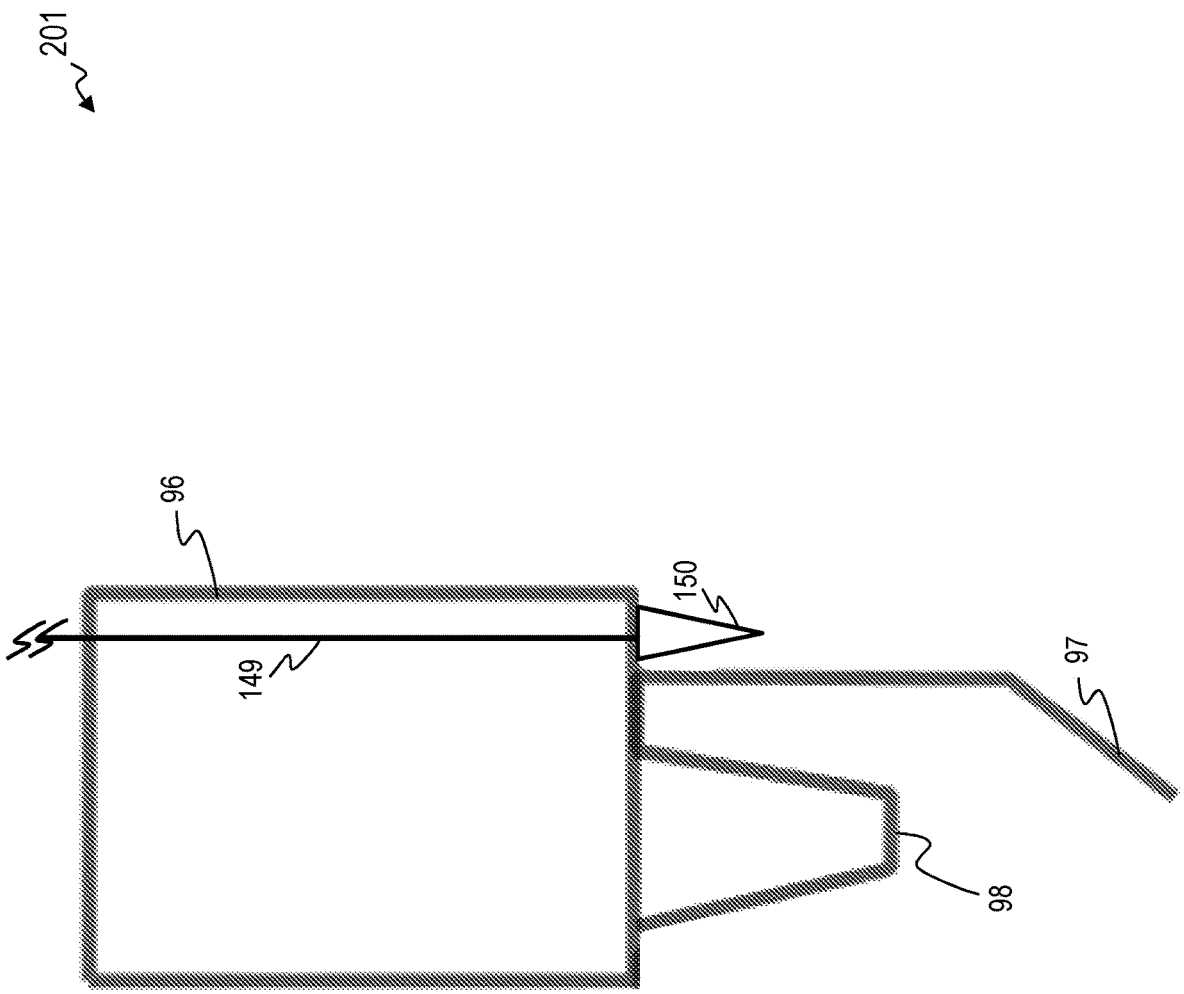

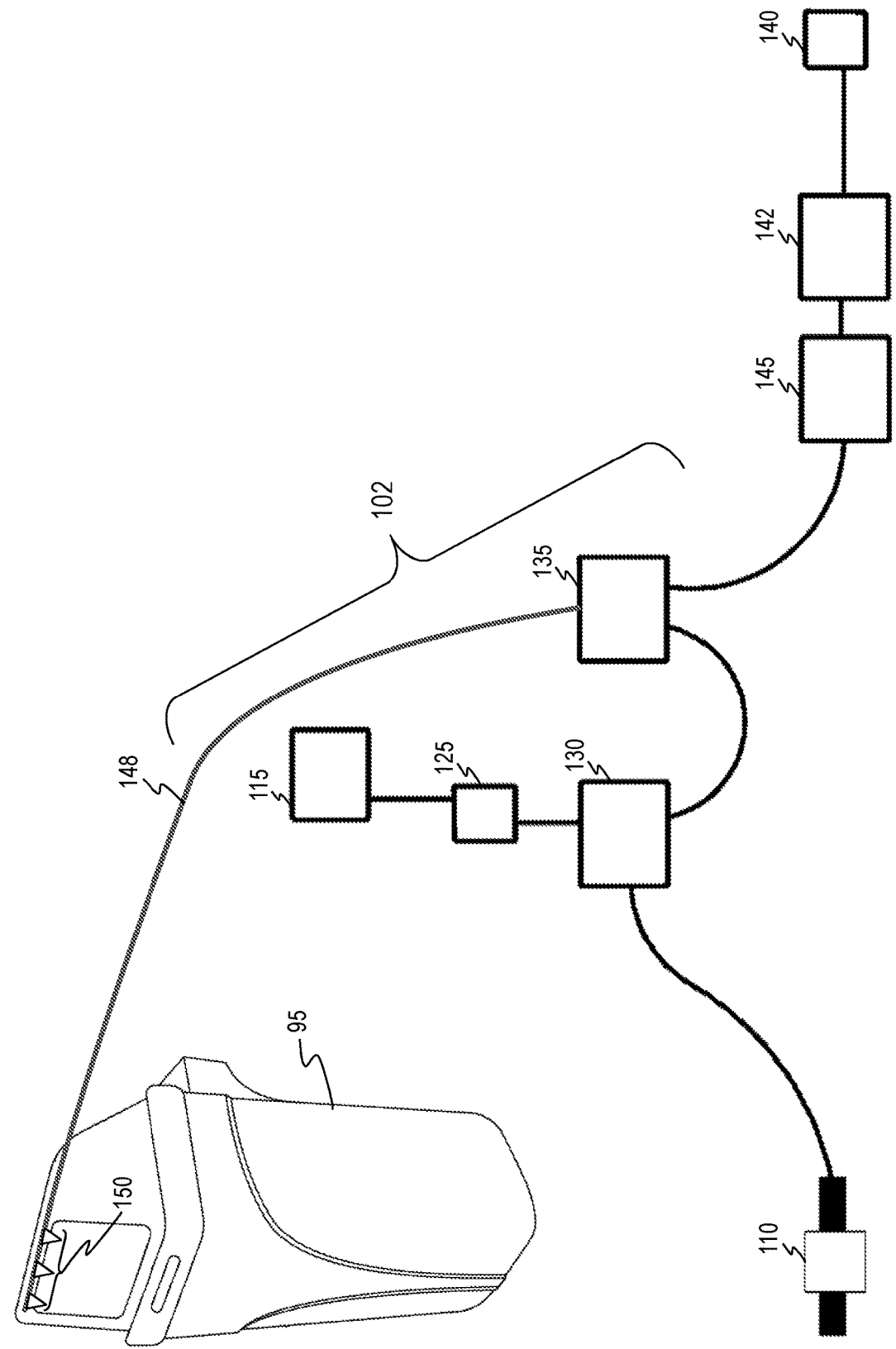

US 10,986,830 B2

APPARATUS AND METHOD FOR REPELLING INSECTS

CROSS-REFERENCE TO RELATED APPLICATIONS

This application claims priority benefit, under 35 U.S.C. § 119(e), of U.S. Provisional Patent Application 62/557,582 filed Sep. 12, 2017, by Mindy A. Lawrence, titled "APPARATUS AND METHOD FOR REPELLING INSECTS," which is incorporated herein by reference in its entirety.

FIELD OF THE INVENTION

The present invention relates to devices and methods to repel insects and in particular to a system and method for protecting users of beverage dispensers, trash receptacles, food carts, and the like from insects such as bees and wasps.

BACKGROUND OF THE INVENTION

Problems associated with the presence of bees and other flying insects are well known, particularly in summer and fall months when people typically engage in many outdoor activities. People have long endured the nuisance and dangers associated with bee and other insect stings and bites, and these risks are often magnified near outdoor beverage dispensers because of the attraction that insects like bees and wasps have to the sugar/syrup associated with sugary beverages like soda.

U.S. Pat. No. 6,054,658 by Edward W. Duhon, et al. (hereinafter, "Duhon et al."), titled "ELECTRICAL SWITCH MAT," issued on Apr. 25, 2000, and is incorporated herein by reference. Duhon et al. describe an electrical switch mat which includes an electrical contact, a support frame, and a plate member. The electrical contact is operable under pressure between a closed condition and an open condition and is maintained in either the opened or closed condition in the absence of pressure. The support frame defines a two-dimensional area and is formed with a protective housing to prevent excessive compression from being transmitted to the components of the electrical contact during activation. The plate member is sized to fit within the two-dimensional area of the support frame and is supported at its perimeter by the support frame. The plate member transmits activating compression to the electrical contact. The electrical contact can be a ribbon switch that may either run substantially continuously or be placed intermittently along the perimeter of the plate member. The ribbon switch includes a pair of vertically spaced electrical conductors enclosed in an insulative jacket such that the conductors are urged into electrical engagement upon compressing the plate member to activate the ribbon switch. The protective housing is generally channel shaped and the electrical contact is positioned within the channel.

U.S. Pat. No. 7,176,397 by John Grzan (hereinafter, "Grzan"), titled "WATER RESISTANT SWITCH MAT HAVING ACTIVATION ACROSS ITS ENTIRE SURFACE," issued on Feb. 13, 2007, and is incorporated herein by reference. Grzan describes an electrical switch mat which generally includes a first layer of flexible matting material, a second layer of flexible matting material, and a perimeter ribbon switch disposed between the first layer and the second layer. The ribbon switch has a longitudinal edge and is operable under pressure between a closed condition and an open condition and maintained in one of the open and closed conditions in the absence of pressure. The first and second layers have a peripheral edge which is aligned with the longitudinal edge of the ribbon switch in a coplanar relationship to form a peripheral edge of the electrical switch mat.

U.S. Pat. No. 8,430,337 by Robert Clarence Pearce, III, et al. (hereinafter, "Pearce et al."), titled "LIGHT-ACTIVATED PORTABLE AEROSOL MIST SPRAYER DEVICE," issued on Apr. 30, 2013, and is incorporated herein by reference. Pearce et al. describe a portable, light-activated, mist sprayer system comprising direct current power supply, an ambient light sensor, electronic circuitry that evaluates an electrical signal received from the light sensor to determine whether a "dusk" or "dawn" light condition exists; a container of treating fluid at a desired concentration; a motor and pump that are activated at the appropriate time as determined by the sensed light condition; at least one sprayer nozzle that will dispense a mist containing the treating fluid whenever the pump is operating; and a timer that turns off the pump after a preset interval to terminate the spraying cycle. A preferred utility for the system of the invention is spraying dilute solutions of insecticide or insect repellent during the periods of significant insect activity that typically occur around dusk and dawn. An RF receiving unit is also disclosed for optional activation using a remote transmitter.

U.S. Pat. No. 9,108,782 by Tai P. Luc, et al. (hereinafter, "Luc et al."), titled "DISPENSING SYSTEMS WITH IMPROVED SENSING CAPABILITIES," issued on Aug. 18, 2015, and is incorporated herein by reference. Luc et al. describe a dispensing system that includes a dispenser, at least one sensor, and a shroud including at least one aperture. A virtual shield is provided between the sensor and the shroud to reduce background noise.

What is needed is an improved, non-toxic and inexpensive apparatus and method to reduce and/or prevent insect gathering near outside food and garbage areas.

SUMMARY OF THE INVENTION

In some embodiments, the present invention provides a system designed to produce a continuous (but interruptible) water mist for a beverage dispenser (e.g., a soda or beer dispenser), trash receptacle, food cart, or other insect attractant. In some embodiments, when in operation, the system sprays a continuous mist (which prevents and/or reduces insect gathering) near the insect attractant until a presence sensor is activated. The present invention is particularly useful in outdoor environments that are not amenable to the use of solid physical barriers such as screen enclosures or the like. In some embodiments, the activation of the presence sensor interrupts the water flow to stop the misting and allow human users to access the beverage dispenser, trash receptacle, food cart, or the like (e.g., in some embodiments, the activation of the presence sensor interrupts the misting such that a drink can be obtained from a beverage dispenser by a user without interference from the mist). In some such embodiments, upon deactivation of the presence sensor (e.g., when the user moves away from the insect attractant), the water flow resumes and the continuous mist restarts.

In some embodiments, the system of the present invention provides an interruptible barrier of continuous water mist between the atmosphere and the insect attractant (e.g., sugar found in soda or similar drink beverages) in order to deter insects (e.g., bees that are attracted to the sugar) from hovering near and/or landing on a soda dispenser. In some embodiments, the cloud of mist sprays continuously until the soda dispenser needs to be used. In some embodiments, when a user approaches the soda dispenser, a presence sensor (e.g., an electric switch mat) located near the soda dispenser is activated and the flow of water stops (and thus the misting ceases) until the presence of the user is no longer detected. In some embodiments, the system of the present invention is activated handsfree and complies with the requirements of the Americans with Disabilities Act (ADA). In some embodiments, the act of stepping on or rolling onto an electronic switch mat (e.g., in a wheelchair) stops the mist and stepping off/rolling off the mat starts the mist.

In some embodiments, the system of the present invention promotes public health and safety by reducing the number of bee stings while providing a chemical-free pest repellent. In some embodiments, the mist generated by the present invention provides an additional benefit of continuously washing water down the drain and cleaning the attractant which helps reduce the substance that attracts the insect.

In some embodiments, the present invention provides a method for repelling insects from a beverage dispenser, the method including generating a mist at the beverage dispenser; detecting a user of the beverage dispenser; and stopping the generating of the mist based at least in part on the detecting of the user.

BRIEF DESCRIPTION OF THE FIGURES

FIG. 1A is a schematic diagram of an insect-repellant system 101, according to some embodiments of the present invention.

FIG. 2A is a schematic diagram of an insect-repellant system 201 showing misting nozzle 150 mounted behind a soda-dispenser switch 97 on beverage dispenser 99, according to some embodiments of the present invention.

FIG. 3A is a schematic diagram of an insect-repellant system 301, according to some embodiments of the present invention.

DETAILED DESCRIPTION OF THE INVENTION

Figure 1B:
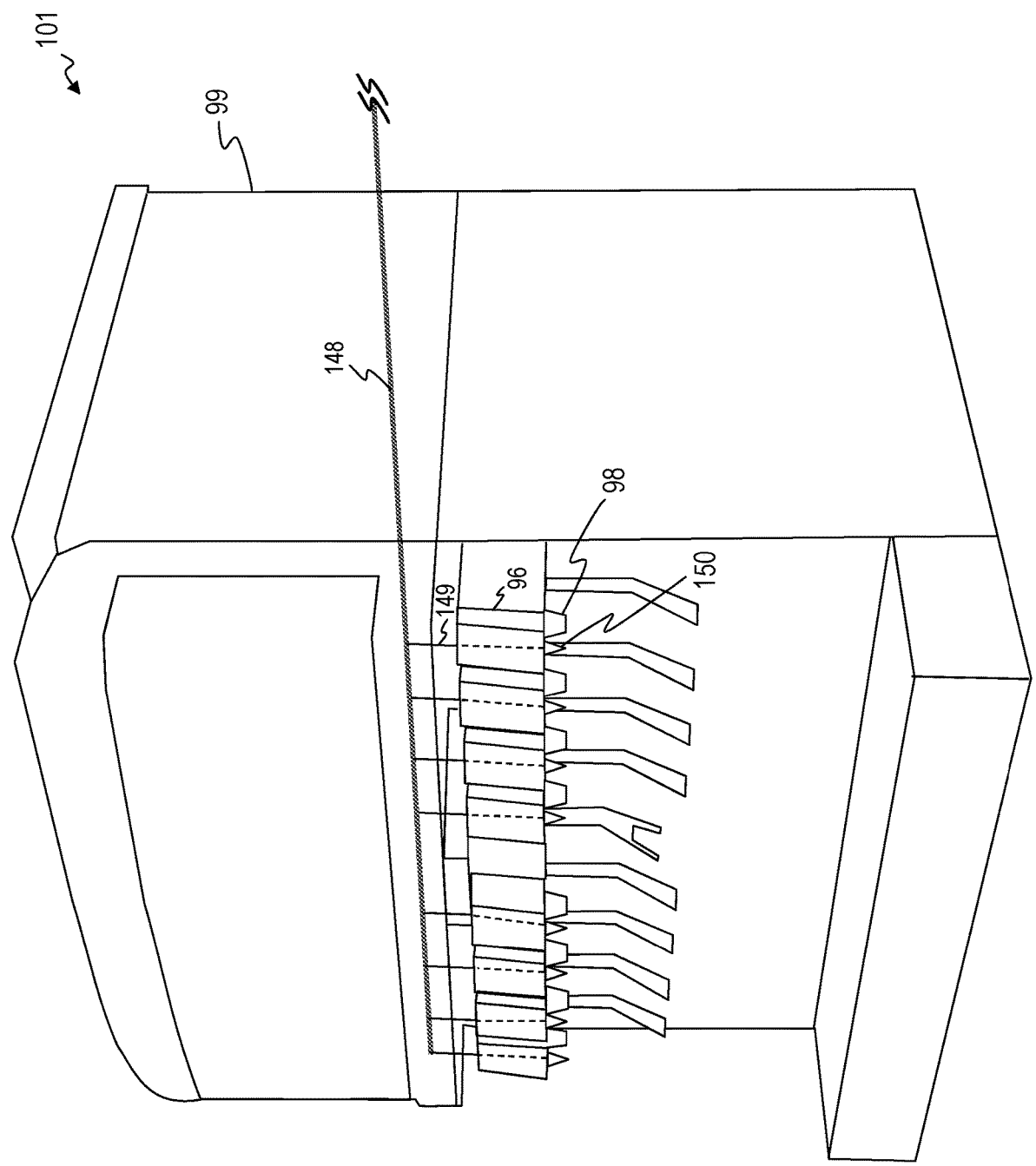
FIG. 1B is a magnified perspective view of a portion of system 101 showing the one or more misting nozzles 150 operatively coupled to beverage dispenser 99.

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment, including embodiments that include some of the features from one embodiment combined with some of the features of embodiments described in the patents and application publications incorporated by reference in the present application). Further, some embodiments include fewer than all the components described as part of any one of the embodiments described herein.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Certain marks referenced herein may be common-law or registered trademarks of third parties affiliated or unaffiliated with the applicant or the assignee. Use of these marks is for providing an enabling disclosure by way of example and shall not be construed to limit the scope of the claimed subject matter to material associated with such marks.

FIG. 1A is a schematic diagram of an insect-repellant system 101, according to some embodiments of the present invention. In some embodiments, system 101 is a permanent, hardwired, hard-plumbed misting system operatively coupled to a beverage dispenser 99 (e.g., in some embodiments, a soda dispenser). In some embodiments, system 101 includes a control system 102 having a presence sensor 110 (e.g., in some embodiments, a switch mat such as a CVP™ Signal Mat provided by Tapeswitch® Corporation, www.tapeswitch.com/Mats/CVP.html; in some embodiments, the switch mat and/or surrounding area includes a non-slip mat or the like), a 110-volt power supply 115, a continuous potable water supply 140, a water-filtration module 145 (e.g., in some embodiments, module 145 includes a Big Blue® heavy-duty series filter housing such as provided by Pentair®, www.waterpurification.pentair.com/en-US/product/heavy-duty/big-blue/), a solenoid valve 135 (e.g., in some embodiments, a RedHat® general-service solenoid valve such as provided by ASCO® (e.g., model 8210G022; www.asco.com/en-us/Pages/solenoid-valves.aspx), a control box 130, one or more misting nozzles 150 (e.g., food-grade misting nozzles), water tubing 148 (e.g., food-grade water tubing), a timer 125 for pre-programming hours of use, and a water meter 142 for monitoring when the filter in water-filtration module 145 needs to be replaced.

In some embodiments, the presence sensor 110 includes a motion detector (such as a passive infrared (PIR) detector as are available from ADAFRUIT at website learmadafruit-.com/pir-passive-infrared-proximity-motion-sensor) instead of or in addition to the switch mat. In other embodiments, any other suitable presence detector or combination of detectors is used.

FIG. 1B is a magnified perspective view of a portion of system 101 showing the one or more food-grade misting nozzles 150 operatively coupled to beverage dispenser 99. In some embodiments, beverage dispenser 99 includes a plurality of beverage modules 96 that are each associated with a specific flavor or type of beverage (e.g., in some embodiments, each beverage module 96 identifies and dispenses a unique soda beverage). In some embodiments, each misting nozzle 150 is coupled to water tubing 148 via an individual water connection 149 (e.g., in some embodiments, water connection 149 is food-grade water tubing like water tubing 148; in other embodiments, water connection 149 is any other suitable water conduit). In some embodiments, each water connection 149 is passed along a side of (or behind) the corresponding beverage module 96 such that the label identifying the beverage at the front of the corresponding beverage module 96 can be viewed by the user (therefore, the portion of water connection 149 shown as passing across beverage module 96 is shown as a dotted line since it does not actually pass in front of beverage module 96 and may not be in view in FIG. 1B). In some embodiments, as shown in FIG. 1B, each beverage-dispenser spout 98 includes a corresponding misting nozzle 150. In other embodiments, system 101 includes fewer misting nozzles 150 than beverage-dispenser spouts 98, but the nozzles 150 are spread out evenly such that each spout 98 is provided with a substantially equal amount of mist. In still other embodiments, system 101 includes more misting nozzles 150 than beverage-dispenser spouts 98 (e.g., in some such embodiments, at least some of the misting nozzles 150 include two or more misting nozzles 150).

Figure 1C:
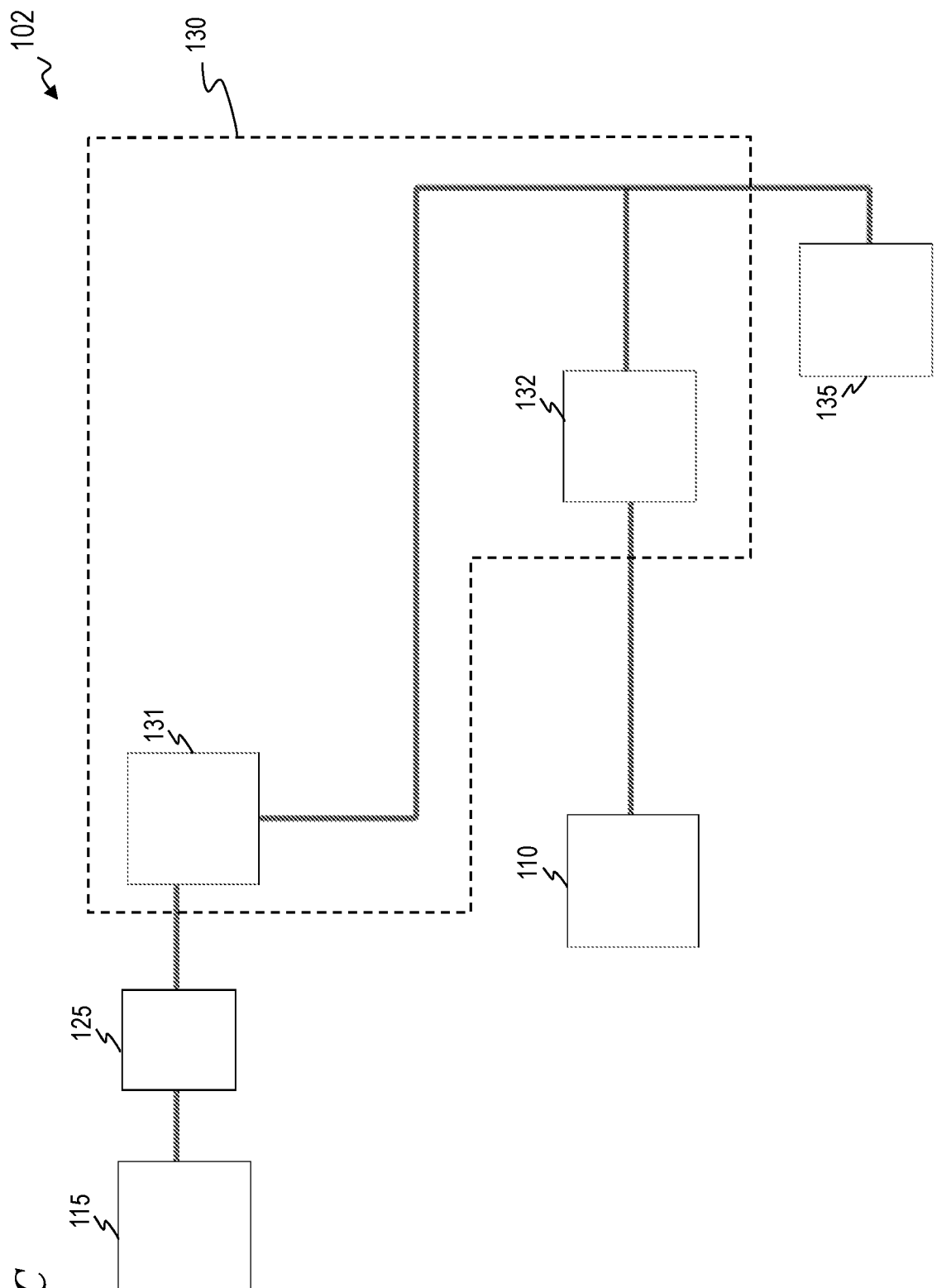
FIG. 1C is a schematic diagram of a control system 102 for controlling insect-repellant system 101, according to some embodiments of the present invention.

FIG. 1C is a schematic diagram of a control system 102 for controlling insect-repellant system 101, according to some embodiments of the present invention. In some embodiments, control system 102 includes power supply 115, timer 125, presence sensor 110 (e.g., in some embodiments, a switch mat such as described above, in some embodiments, an optical sensor such as described in Pearce et al. (incorporated by reference above), in some embodiments, a sensor such as described in Luc et al. (incorporated by reference above), and in other embodiments, any other suitable sensor or sensing system), solenoid valve 135, and control box 130 (also referred to as a controller). In some embodiments, control box 130 includes a transformer 131 and a control relay 132. In some embodiments, sensor 110 is coupled to controller 130 with a wired connection; in other embodiments, sensor 110 is coupled to controller 130 wirelessly. In some embodiments, controller 130 includes a processor coupled to a memory and is configured to provide programmable control for system 101. In some such embodiments, controller 130 is programmed/controlled directly (e.g., using a personal computing device coupled to the processor). In some other such embodiments, controller 130 is programmed/controlled via an application on a mobile device and controller 130 communicates wirelessly with the mobile device via a wireless technology such as Wi-Fi™, Bluetooth®, or the like.

FIG. 2A is a schematic diagram of an insect-repellant system 201 showing misting nozzle 150 mounted behind a beverage-dispenser switch 97 on a beverage module 96, according to some embodiments of the present invention. FIG. 2A shows a side-view of beverage module 96 and includes a beverage-dispenser spout 98 (also referred to herein as a beverage-dispenser nozzle), beverage-dispenser switch 97, and misting nozzle 150 coupled to a water connection 149. In some such embodiments, the mister 150 limits the spray of mist to just the drink dispenser device rather than the entire area.

Figure 2B:
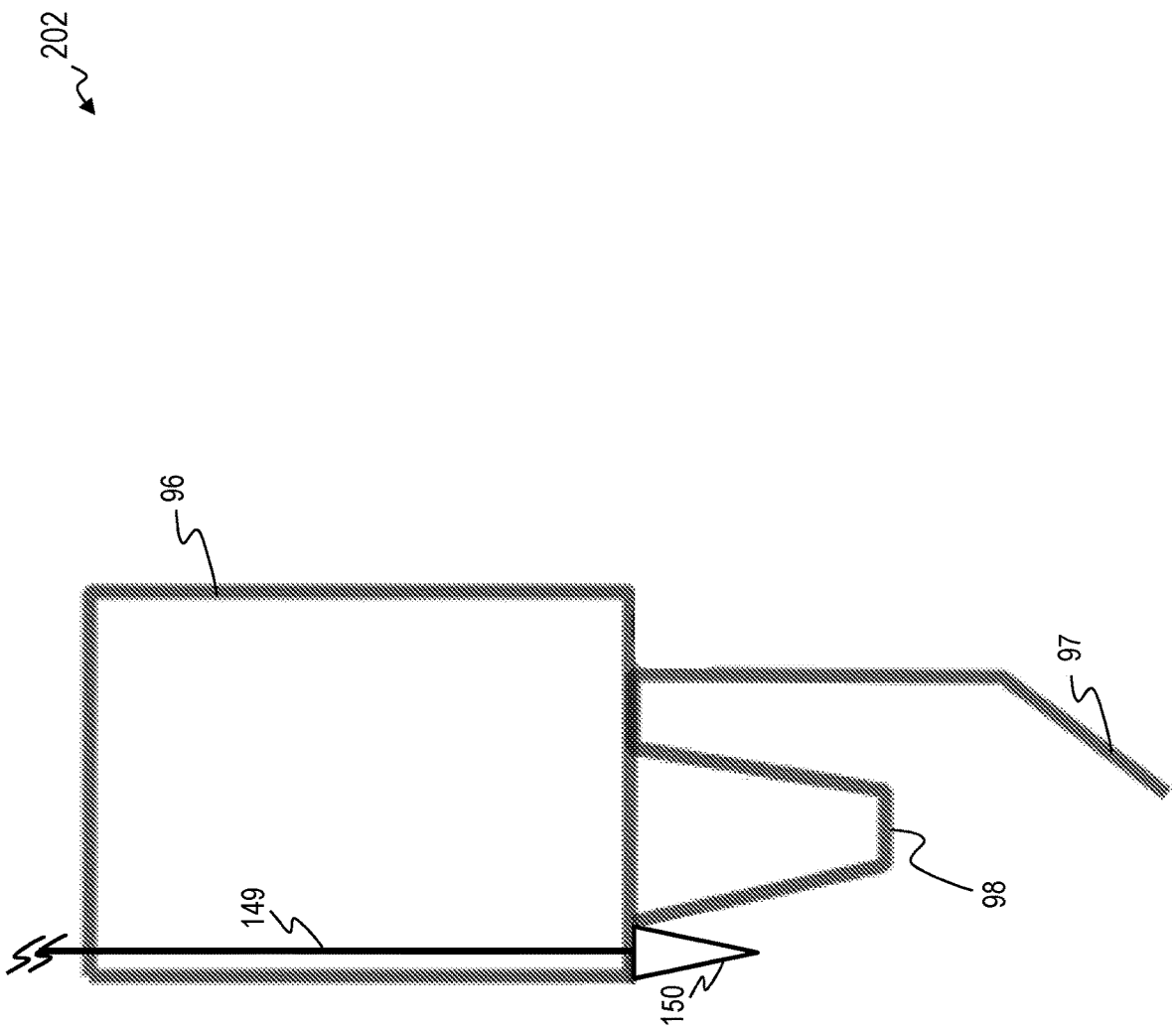
FIG. 2B is a schematic diagram of an insect-repellant system 202 showing misting nozzle 150 mounted in front of the soda-dispensing nozzle 98, according to some embodiments of the present invention.

FIG. 2B is a schematic diagram of an insect-repellant system 202 showing misting nozzle 150 mounted in front of the beverage-dispenser spout 98, according to some embodiments of the present invention.

Figure 2C:
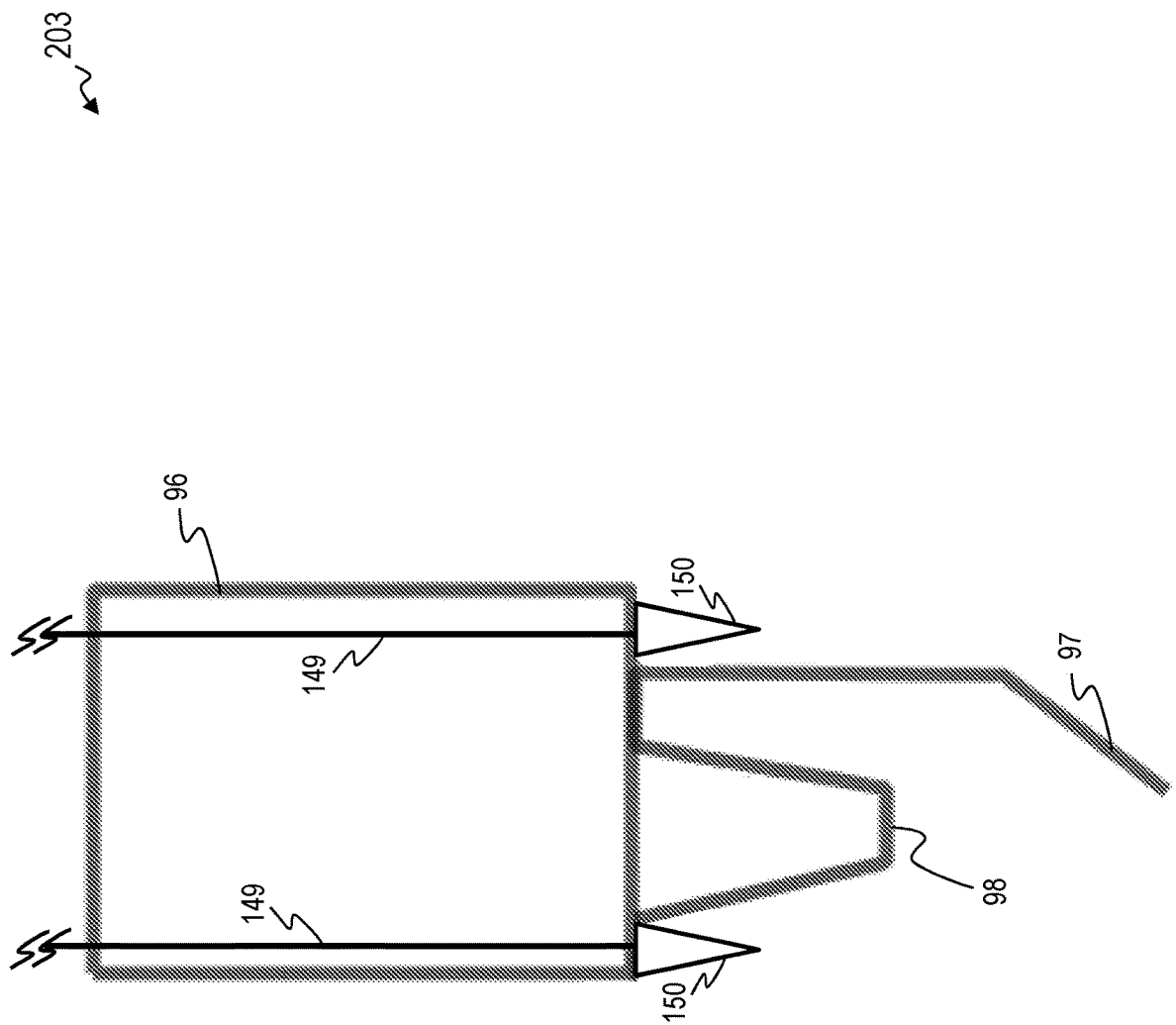
FIG. 2C is a schematic diagram of an insect-repellant system 203 showing a first misting nozzle 150 mounted in front of soda-dispensing nozzle 98 and a second misting nozzle 150 mounted behind soda-dispenser switch 97, according to some embodiments of the present invention.

FIG. 2C is a schematic diagram of an insect-repellant system 203 showing a first misting nozzle 150 mounted in front of beverage-dispenser spout 98 and a second misting nozzle 150 mounted behind beverage-dispenser switch 97, according to some embodiments of the present invention.

In some embodiments, the present invention provides a continuous mist at a beverage dispenser 99 (e.g., a soda dispenser) that deters insects while continuously washing/spraying the sugary surface of the beverage dispenser 99. In some embodiments, the mist is quickly turned off as needed in a handsfree/ADA compliant manner when a user operates beverage dispenser 99. In some embodiments, mister nozzles 150 are fed by water supply 140 and controlled by solenoid valve 135 that is activated by presence sensor 110 (e.g., a switch mat such as described above). In some embodiments, water supply 140 is filtered by water-filtration module 145 to prevent micro particles from plugging mister nozzles 150. In some embodiments, switch mat 110 switches mister nozzles 150 off when the presence of a user is detected, and when the user is no longer detected, mister nozzles 150 switch back on. In some embodiments, the system of the present invention is on timer 125 to start and stop during operation hours and save water. In some embodiments, water meter 142 identifies gallons between filter changes (e.g., in some embodiments, the filter used in water-filtration module 145 has a life of approximately 400 gallons). In some embodiments, switch mat 110 is controlled by an 18/2 low-voltage wire that is connected to transformer 131, and transformer 131 converts 110 power to low-voltage 24-volt power. In some embodiments, the 24-volt power feeds switch mat 110 and solenoid valve 135. In some embodiments, the present invention includes one (1) mister nozzle 150 for every two (2) soda-dispenser nozzles 98. In some embodiments, any other suitable ratio of mister nozzles 150 to soda-dispenser nozzles 98 is used. In some embodiments, water supply 140 is potable water that is sensitive to pesticides, insecticides, and related chemicals. In some embodiments, the present invention promotes public health by deterring bees/helping limit the number of bee stings.

FIG. 3A is a schematic diagram of an insect-repellant system 301, according to some embodiments of the present invention. In some embodiments, system 301 is substantially similar to system 101 of FIG. 1A, except that the misting nozzles 150 are coupled to a waste receptacle 95 to prevent insects from bothering users of waste receptacle 95.

Figure 3B:
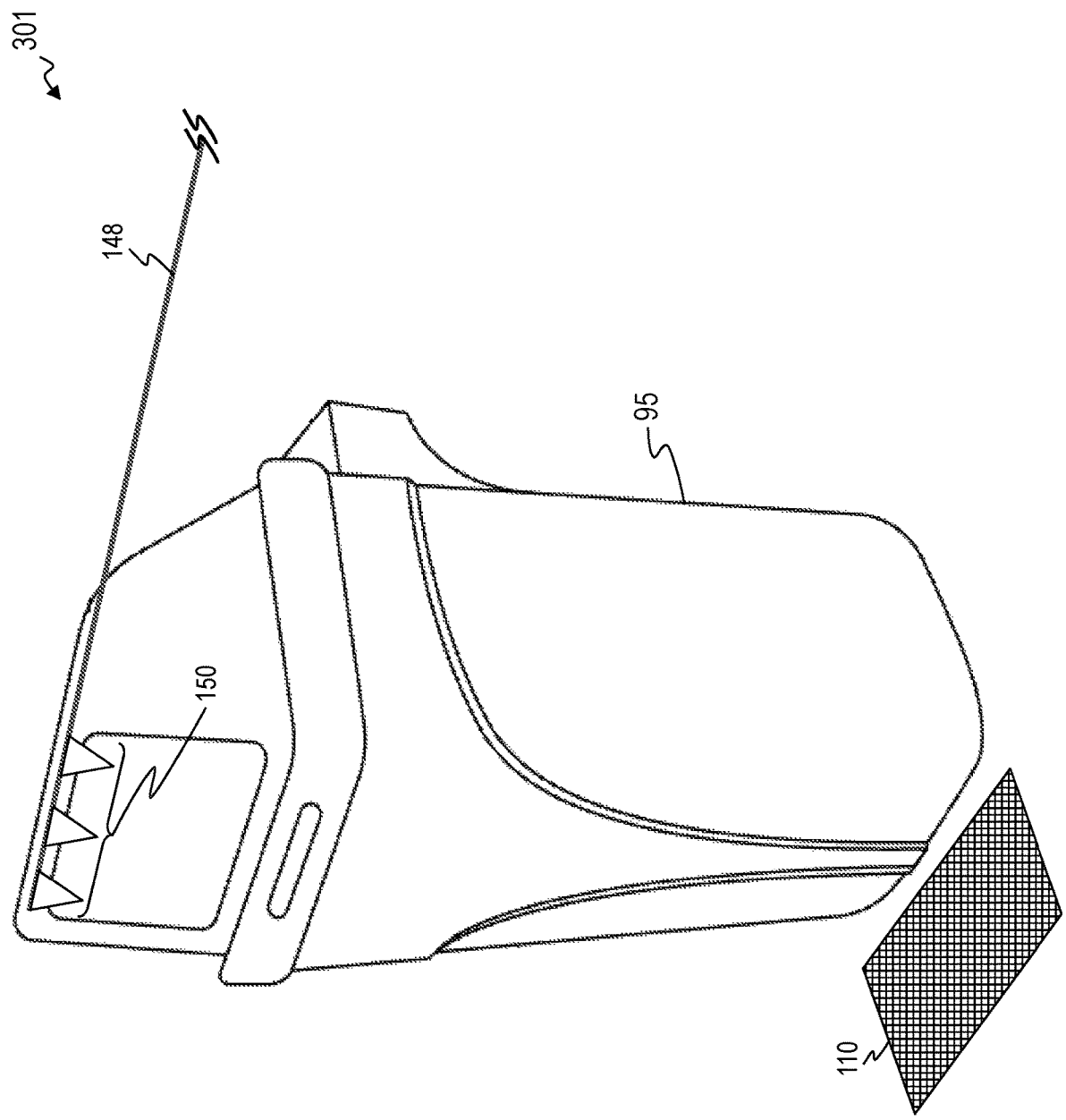
FIG. 3B is a magnified perspective view of a portion of system 301 showing the one or more misting nozzles 150 operatively coupled to waste receptacle 95.

FIG. 3B is a magnified perspective view of a portion of system 301 showing the one or more misting nozzles 150 operatively coupled to waste receptacle 95.

Figure 4A:
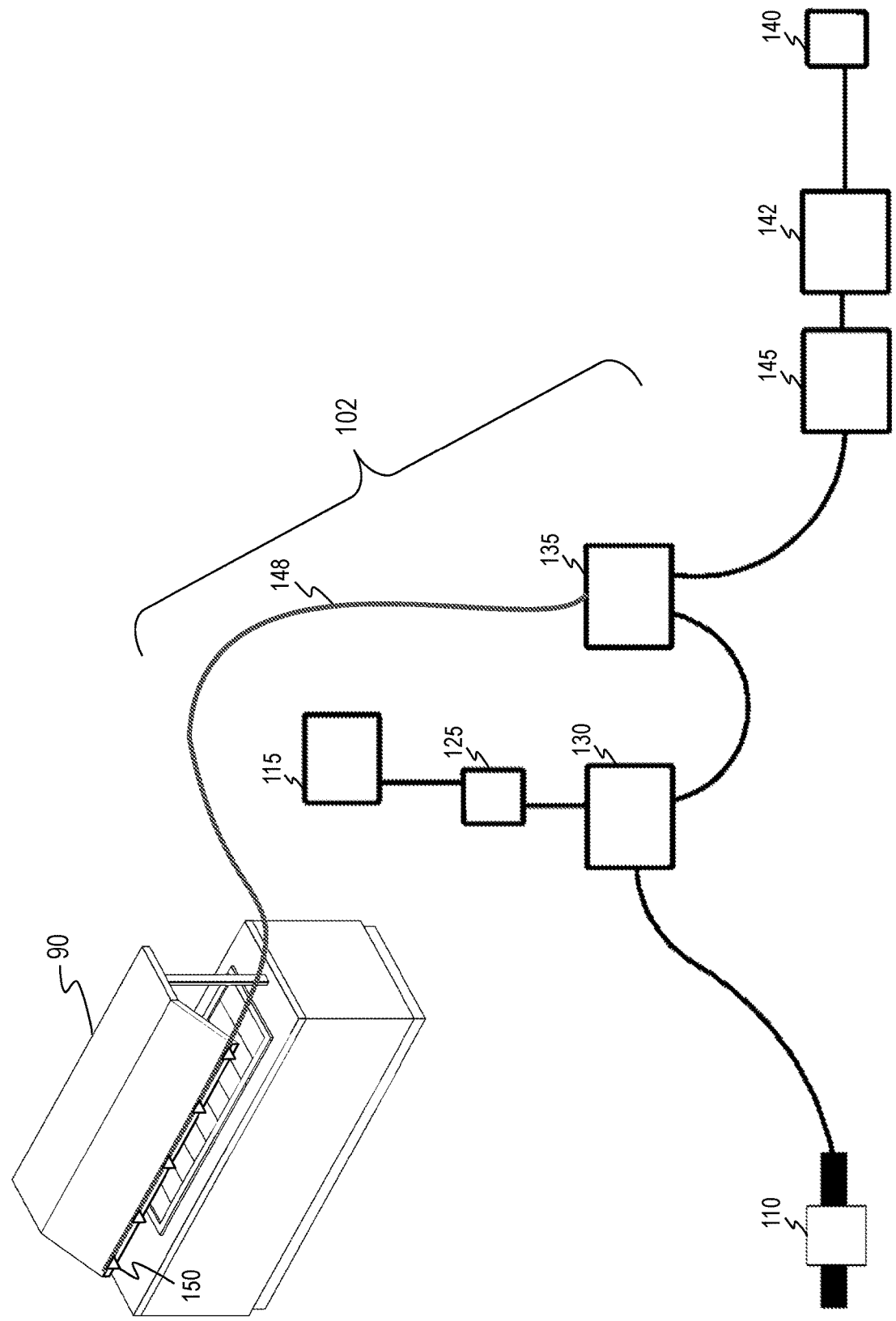
FIG. 4A is a schematic diagram of an insect-repellant system 401, according to some embodiments of the present invention.

FIG. 4A is a schematic diagram of an insect-repellant system 401, according to some embodiments of the present invention. In some embodiments, system 401 is substantially similar to system 101 of FIG. 1A, except that the misting nozzles 150 are coupled to a buffet-style serving table 90 (also referred to herein as a food-service buffet table, food table, and food cart) to prevent insects from bothering users of serving table 90. In some embodiments, system 401 is substantially similar to system 101 of FIG. 1A, except that the misting nozzles 150 are coupled to a condiment counter (such as ketchup and mustard pump dispensers).

Figure 4B:
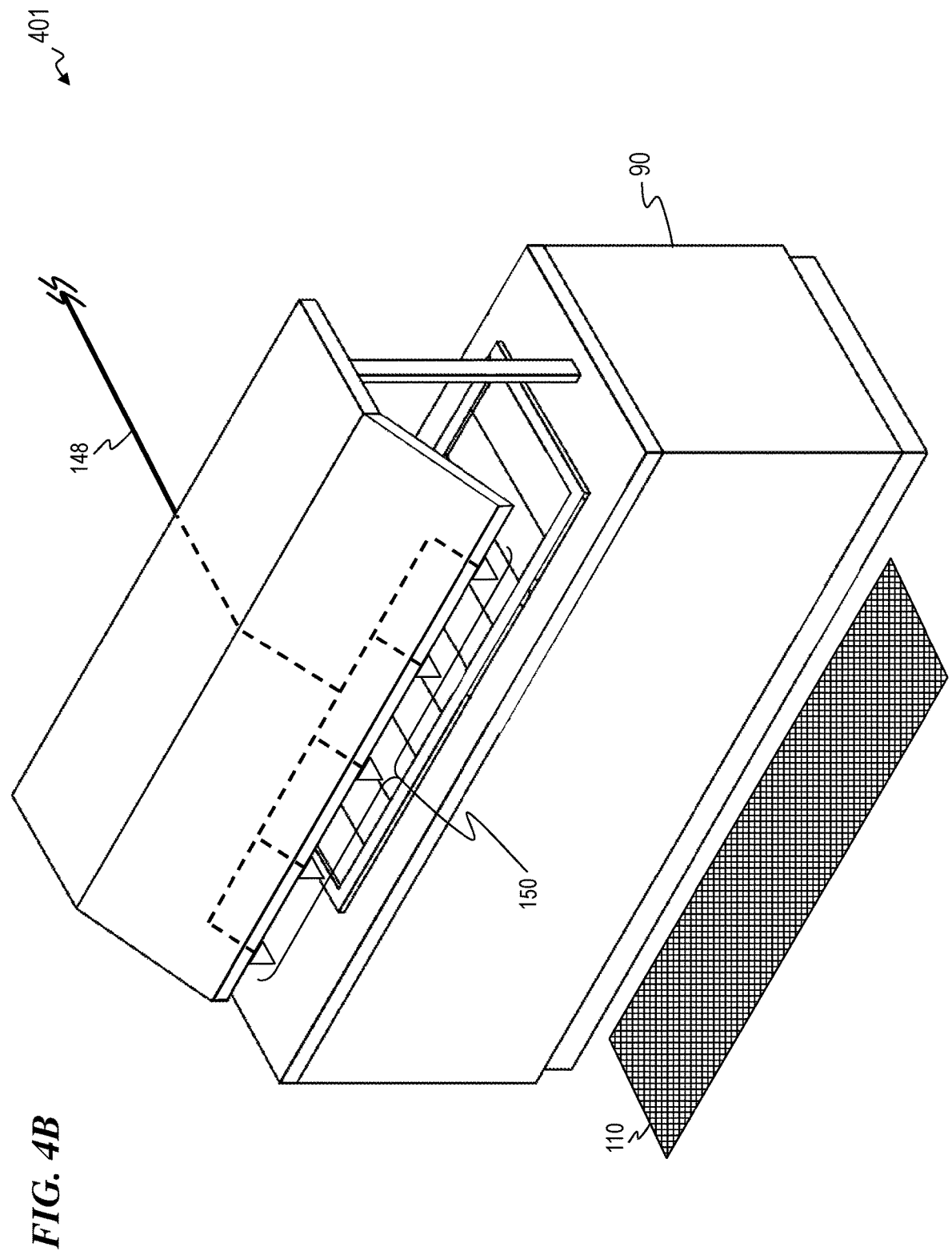
FIG. 4B is a magnified perspective view of a portion of system 401 showing the one or more misting nozzles 150 operatively coupled to serving table 90.

FIG. 4B is a magnified perspective view of a portion of system 401 showing the one or more misting nozzles 150 operatively coupled to serving table 90. In some embodiments, water tubing 148 is run to the nozzles 150 underneath the "roof" of serving table 90 so this portion of tubing 148 is shown in broken lines on FIG. 4B.

In some embodiments, the present invention provides a system for repelling insects from a beverage dispenser, the system including a mister device coupled to the beverage dispenser and configured to generate a mist at the beverage dispenser; and a sensor operatively coupled to the mister device and configured to produce a sense signal when a user of the beverage dispenser is detected by the sensor, wherein the mister device is configured to stop generation of the mist based at least in part on the sense signal such that the user can dispense a beverage from the beverage dispenser without being exposed to the mist. In some embodiments of the system, the mister device is further configured to restart generation of the mist once the user is no longer detected by the sensor. In some embodiments, the sensor includes a switch mat placed near the beverage dispenser such that the user steps on the switch mat when the user uses the beverage dispenser. In some embodiments, the mister device includes a plurality of food-grade mist nozzles.

In some embodiments, the system further includes the beverage dispenser, wherein the beverage dispenser includes a plurality of beverage modules, wherein the mister device includes a plurality of food-grade mist nozzles, wherein each one of the plurality of beverage modules is associated with at least a first corresponding mist nozzle of the plurality of mist nozzles. In some embodiments, the mister device includes a plurality of food-grade mist nozzles, wherein each respective one of the plurality of food-grade mist nozzles is coupled to a water conduit that provides water to the respective mist nozzle.

In some embodiments, the system further includes a water source and a water line, wherein the water source provides water to the mister device via the water line; a water-filtration module operatively coupled to the water source and configured to filter water outputted from the water source such that the mister receives filtered water from the water source; a valve operatively coupled to the water line; and a controller operatively coupled to the sensor and the valve in order to control a supply of the filtered water to the mister device, wherein the controller causes the valve to stop the supply of filtered water to the mister device upon receiving the sense signal from the sensor.

In some embodiments, the system further includes the beverage dispenser, wherein the beverage dispenser includes a plurality of beverage modules; wherein each respective one of the plurality of food-grade mist nozzles is coupled to a water conduit that provides water to the respective mist nozzle, wherein each respective water conduit passes to a side of a corresponding one of the plurality of beverage modules. In some embodiments, the system further includes a water source and a water line, wherein the water source provides water to the mister device via the water line; a valve operatively coupled to the water line; and a controller operatively coupled to the sensor and the valve in order to control a supply of the water to the mister device, wherein the controller causes the valve to stop the supply of water to the mister device upon receiving the sense signal from the sensor, and wherein the controller includes a timer module configured to provide pre-programmed usage periods for the mister device.

In some embodiments, the system further includes a water source and a water line, wherein the water source provides water to the mister device via the water line; a valve operatively coupled to the water line; and a controller operatively coupled to the sensor and the valve in order to control a supply of the water to the mister device, wherein the controller causes the valve to stop the supply of water to the mister device upon receiving the sense signal from the sensor, and wherein the controller is configured to be programmed remotely via a mobile device.

In some embodiments, the present invention provides a method for repelling insects from a beverage dispenser, the method including generating a mist at the beverage dispenser; detecting a user of the beverage dispenser; and stopping the generating of the mist based at least in part on the detecting of the user. In some embodiments, the method further includes restarting the generating of the mist once the user is no longer detected.

In some embodiments, the present invention provides a system for repelling insects from an object, the system including a mister device coupled to the object and configured to generate a mist at the object; and a sensor operatively coupled to the mister device and configured to produce a sense signal when a user of the object is detected by the sensor, wherein the mister device is configured to stop generation of the mist based at least in part on the sense signal such that the user can use the object without being exposed to the mist.

In some embodiments of the system, the object includes a beverage dispenser, and the sensor includes a passive infrared (PIR) sensor located to detect a human user approaching the beverage dispenser.

In some embodiments of the system, the mister device is further configured to restart generation of the mist once the user is no longer detected by the sensor. In some embodiments, the sensor includes a mat placed near the object such that the user steps on the mat when the user uses the beverage dispenser. In some embodiments, the mister device includes one or more mist nozzles. In some embodiments, the mister device includes one or more mist nozzles, wherein the sensor includes a mat placed near the object such that the user steps on the mat when the user uses the object, and wherein the mister device is further configured to restart generation of the mist once the user is no longer detected by the sensor. In some embodiments, the object includes a beverage dispenser. In some embodiments, the object includes a waste receptacle. In some embodiments, the object includes a food-service buffet table. In some embodiments, the object includes a condiment counter.

In some embodiments of the system, the object includes a beverage dispenser and the system further includes the beverage dispenser, wherein the beverage dispenser includes a plurality of beverage modules, wherein the mister device includes a plurality of mist nozzles, wherein each one of the plurality of beverage modules is associated with at least a first corresponding mist nozzle of the plurality of mist nozzles. In some embodiments, the object includes a beverage dispenser and the system further includes the beverage dispenser, wherein the beverage dispenser includes a plurality of beverage modules; wherein each respective one of the plurality of mist nozzles is coupled to a water conduit that provides water to the respective mist nozzle, wherein each respective water conduit passes to a side of a corresponding one of the plurality of beverage modules.

In some embodiments of the system, the mister device includes a plurality of mist nozzles, wherein each respective one of the plurality of mist nozzles is coupled to a water conduit that provides water to the respective mist nozzle. In some embodiments, the system further includes a water source and a water line, wherein the water source provides water to the mister device via the water line; a water-filtration module operatively coupled to the water source and configured to filter water outputted from the water source such that the mister receives filtered water from the water source; a valve operatively coupled to the water line; and a controller operatively coupled to the sensor and the valve in order to control a supply of the filtered water to the mister device, wherein the controller causes the valve to stop the supply of filtered water to the mister device upon receiving the sense signal from the sensor.

In some embodiments, the system further includes a water source and a water line, wherein the water source provides water to the mister device via the water line; a valve operatively coupled to the water line; and a controller operatively coupled to the sensor and the valve in order to control a supply of the water to the mister device, wherein the controller causes the valve to stop the supply of water to the mister device upon receiving the sense signal from the sensor, and wherein the controller includes a timer module configured to provide pre-programmed usage periods for the mister device. In some embodiments, the system further includes a water source and a water line, wherein the water source provides water to the mister device via the water line; a valve operatively coupled to the water line; and a controller operatively coupled to the sensor and the valve in order to control a supply of the water to the mister device, wherein the controller causes the valve to stop the supply of water to the mister device upon receiving the sense signal from the sensor, and wherein the controller is configured to be programmed remotely via an application on a mobile device.

In some embodiments of the system, the mister device includes one or more mist nozzles, wherein the sensor includes a mat placed near the object such that the user steps on the mat when the user uses the object, and wherein the mister device is further configured to restart generation of the mist once the user is no longer detected by the sensor, the system further including a water source and a water line, wherein the water source provides water to the mister device via the water line; a valve operatively coupled to the water line; and a controller operatively coupled to the sensor and the valve in order to control a supply of the water to the mister device, wherein the controller causes the valve to stop the supply of water to the mister device upon receiving the sense signal from the sensor, and wherein the controller includes a timer module configured to provide pre-programmed usage periods for the mister device.

In some embodiments, the present invention provides a method for repelling insects from an object, the method including generating a mist at the object; detecting a user of the object; and stopping the generating of the mist based at least in part on the detecting of the user such that the user can use the object without being exposed to the mist. In some embodiments, the method further includes restarting the generating of the mist once the user is no longer detected. In some embodiments, the detecting of the user includes providing a mat sensor, and placing the mat sensor near the object such that the user steps on the mat when the user uses the object. In some embodiments, the generating of the mist includes providing a plurality of mist nozzles, and coupling the plurality of mist nozzles to the object.

In some embodiments of the method, the detecting of the user includes providing a mat sensor, and placing the mat sensor near the object such that the user steps on the mat when the user uses the object, wherein the generating of the mist includes providing a plurality of mist nozzles, and coupling the plurality of mist nozzles to the object, the method further including restarting the generating of the mist once the user is no longer detected. In some embodiments, the object includes a beverage dispenser. In some embodiments, the object includes a waste receptacle. In some embodiments, the object includes a food-service buffet table. In some embodiments, the object includes a condiment counter.

In some embodiments of the method, the generating of the mist includes providing a plurality of mist nozzles, coupling the plurality of mist nozzles to the object, filtering water from a water supply to generate filtered water, and conveying the filtered water to the plurality of mist nozzles, wherein the conveying of the filtered water is stopped based at least in part on the detecting of the user. In some embodiments, the generating of the mist includes providing a plurality of mist nozzles, coupling the plurality of mist nozzles to the object, filtering water from a water supply to generate filtered water, and conveying the filtered water to the plurality of mist nozzles, wherein the conveying of the filtered water is stopped based at least in part on the detecting of the user, and wherein the conveying is controlled at least in part by pre-programmed usage periods. In some embodiments, the generating of the mist includes providing a plurality of mist nozzles, coupling the plurality of mist nozzles to the object, filtering water from a water supply to generate filtered water, and conveying the filtered water to the plurality of mist nozzles, wherein the conveying of the filtered water is stopped based at least in part on the detecting of the user, and wherein the conveying is controlled remotely via an application on a mobile device.

In some embodiments, the present invention provides a system for repelling insects from an object, the system including means for generating a mist at the object (e.g., a plurality of mist nozzles coupled to a water source); means for detecting a user of the object (e.g., a switch mat); and means for stopping the generating of the mist when the means for detecting detects the user (e.g., a controller and a valve operatively coupled to the means for detecting and the water source, reacting to a signal from the means for detecting indicating that a user is present). In some embodiments of the system, the object includes a beverage dispenser. In some embodiments, the object includes a waste receptacle. In some embodiments, the object includes a food-service buffet table. In some embodiments, the object includes a condiment counter. In some embodiments, the system further includes means for restarting the generating of the mist once the user is no longer detected (e.g., the controller and valve operatively coupled to the means for detecting and the water source, reacting to a signal from the means for detecting indicating that a user is not present). In some embodiments, the system further includes a water source and a water line, wherein the water source provides water to the means for generating the mist via the water line; means for filtering water outputted from the water source (e.g., a water filter such as water-filtration module 145) such that the means for generating the mist receives filtered water from the water source; and means for controlling a supply of the filtered water to the means for generating the mist (e.g., the controller and valve operatively coupled to the means for detecting and the means for filtering water, reacting to signals from the means for detecting indicating whether or not a user is present).

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first, " "second," and "third," etc., are used merely as labels, and are not intended to impose numerical requirements on their objects.

What is claimed is:

1. A system for repelling insects from a beverage dispenser, the system comprising:
   the beverage dispenser, wherein the beverage dispenser includes a plurality of beverage module spouts;
   a mister device configured to be operatively coupled to a potable-water source and configured to generate a potable-water mist at the beverage dispenser, wherein the mister device includes a plurality of mist nozzles, wherein each respective one of the plurality of mist nozzles is coupled to a respective water conduit that provides water to the respective mist nozzle, and wherein each respective water conduit passes to a side of a corresponding one of the plurality of beverage module spouts; and
   a sensor operatively coupled to the mister device and configured to produce a sense signal when a human user of the beverage dispenser is detected by the sensor, wherein the mister device is configured to stop generation of the potable-water mist based at least in part on the sense signal such that the human user can use the beverage dispenser without being exposed to the potable-water mist.

2. The system of claim 1, wherein the mister device is further configured to restart generation of the potable-water mist once the user is no longer detected by the sensor.

3. The system of claim 1, wherein the sensor includes a switch mat placed near the beverage dispenser such that the switch mat is activated when the user uses the beverage dispenser.

4. The system of claim 1, wherein the sensor includes a passive infrared (PIR) sensor located to detect a human user approaching the beverage dispenser.

5. The system of claim 1, wherein the sensor includes a switch mat placed near the beverage dispenser such that the switch mat is activated when the user uses the beverage dispenser, and wherein the mister device is further configured to restart generation of the potable-water mist once the user is no longer detected by the sensor.

6. The system of claim 1, further comprising:
   a water line, wherein the water line is configured to convey potable water between the potable water source and the mister device;
   a valve operatively coupled to the water line; and
   a controller operatively coupled to the sensor and the valve in order to control a supply of the potable water to the mister device, wherein the controller causes the valve to stop the supply of potable water to the mister device upon receiving the sense signal from the sensor, and wherein the controller includes a timer module configured to provide pre-programmed usage periods for the mister device.

7. The system of claim 1, further comprising:
   a water line, wherein the water line is configured to convey potable water between the potable water source and the mister device;
   a valve operatively coupled to the water line; and
   a controller operatively coupled to the sensor and the valve in order to control a supply of the potable water to the mister device, wherein the controller causes the valve to stop the supply of potable water to the mister device upon receiving the sense signal from the sensor, and wherein the controller is configured to be programmed remotely via an application on a mobile device.

8. The system of claim 1, wherein the sensor includes a mat placed near the beverage dispenser such that the mat is activated when the user uses the beverage dispenser, and wherein the mister device is further configured to restart generation of the potable-water mist once the user is no longer detected by the sensor, the system further comprising:
   a water line, wherein the water line is configured to convey potable water between the potable water source and the mister device;
   a valve operatively coupled to the water line; and
   a controller operatively coupled to the sensor and the valve in order to control a supply of the potable water to the mister device, wherein the controller causes the valve to stop the supply of potable water to the mister device upon receiving the sense signal from the sensor, and wherein the controller includes a timer module configured to provide pre-programmed usage periods for the mister device.

* * * * *